(12) United States Patent
Zhang et al.

(10) Patent No.: US 8,734,572 B2
(45) Date of Patent: May 27, 2014

(54) QUICK ENGAGEMENT METHOD FOR GAS TURBINE INLET FILTER INSTALLATION AND REPLACEMENT

(75) Inventors: Jianmin Zhang, Greer, SC (US); Bradly Aaron Kippel, Greenville, SC (US)

(73) Assignee: BHA Altair, LLC, Franklin, TN (US)

( * ) Notice: Subject to any disclaimer, the term of this patent is extended or adjusted under 35 U.S.C. 154(b) by 0 days.

(21) Appl. No.: 13/438,142

(22) Filed: Apr. 3, 2012

(65) Prior Publication Data

US 2013/0255208 A1    Oct. 3, 2013

(51) Int. Cl.
*B01D 46/04* (2006.01)

(52) U.S. Cl.
USPC .............. 95/273; 55/374; 55/480; 55/492; 55/493; 55/496

(58) Field of Classification Search
USPC .......... 55/374, 483, 490, 493, 378, 478, 481, 55/508, 302, 495, 507, 511, 379; 95/273; 210/323.2, 493.2, 493.5
See application file for complete search history.

(56) References Cited

U.S. PATENT DOCUMENTS

| | | | |
|---|---|---|---|
| 4,557,738 A | 12/1985 | Menasian | |
| 5,549,723 A * | 8/1996 | Terry | 55/493 |
| 6,214,077 B1 * | 4/2001 | Bitner et al. | 55/490 |
| 6,613,115 B2 * | 9/2003 | Moore | 55/302 |
| 6,960,245 B2 | 11/2005 | Tokar et al. | |
| 6,974,491 B1 * | 12/2005 | Kendall | 55/493 |
| 6,994,744 B2 | 2/2006 | Tokar et al. | |
| 7,252,704 B2 | 8/2007 | Tokar et al. | |
| 7,625,419 B2 | 12/2009 | Nelson et al. | |
| 7,833,300 B2 | 11/2010 | Taniuchi et al. | |
| 7,934,617 B2 | 5/2011 | Minowa et al. | |
| 8,048,186 B2 * | 11/2011 | Mann et al. | 55/483 |
| 8,425,671 B2 * | 4/2013 | Mann et al. | 95/273 |
| 2004/0103626 A1 | 6/2004 | Warth | |
| 2004/0103636 A1 | 6/2004 | Komiya | |
| 2004/0255781 A1 | 12/2004 | Tokar et al. | |
| 2010/0326024 A1 | 12/2010 | Vanderlinden et al. | |
| 2011/0265434 A1 | 11/2011 | Polizzi | |
| 2012/0110963 A1 * | 5/2012 | Jarrier | 55/374 |

FOREIGN PATENT DOCUMENTS

| | | | |
|---|---|---|---|
| EP | 1391232 A1 | 2/2004 | |
| EP | 1762325 A1 | 3/2007 | |
| EP | 2319601 A1 | 5/2011 | |
| WO | 2006017790 A1 | 2/2006 | |
| WO | 2006076479 A1 | 7/2006 | |
| WO | 2009064894 A1 | 5/2009 | |
| WO | 2010151580 A1 | 12/2010 | |
| WO | 2011005438 A2 | 1/2011 | |

OTHER PUBLICATIONS

EP Search Report issued in connection with corresponding EP Patent Application No. 13161783.9 dated on Jun. 21, 2013.

* cited by examiner

*Primary Examiner* — Duane Smith
*Assistant Examiner* — Minh-Chau Pham
(74) *Attorney, Agent, or Firm* — Reinhart Boerner Van Deuren P.C.

(57) ABSTRACT

A filter installation arrangement and an associated method of installing a filter assembly to a partition. A filter assembly includes a filter element that extends along a longitudinal axis. The filter element includes an end cap disposed at an end of the filter element. An adjustment device of the installation arrangement axially displaces the end cap of the filter element in a first direction. An insert portion is inserted adjacent the end cap subsequent to the axial displacement of the end cap. The insert portion is configured to limit axial displacement of the end cap in a second direction that is opposite the first direction.

23 Claims, 8 Drawing Sheets

QUICK ENGAGEMENT METHOD FOR GAS TURBINE INLET FILTER INSTALLATION AND REPLACEMENT

BACKGROUND OF THE INVENTION

1. Field of the Invention

The present invention relates generally to filters, and more particularly, to improvements in filter installation.

2. Discussion of the Prior Art

Inlet systems for gas turbines are generally used for treating fluid (e.g., air) that passes to the gas turbine. The fluid can be treated by filtering the fluid with one or more filter elements extending within the inlet system. Each filter element may include a pleated hydrophobic or oleophobic media that can simultaneously limit the passage of particles and liquid through the pleated hydrophobic or oleophobic media. However, due to particle buildup, wear and tear, or the like, the filter elements may occasionally need to be removed, replaced, and/or reinstalled. Further, the inlet system may include many filter elements, such that the removal and reinstallation process can be time consuming and can reduce the availability of the gas turbine system due to downtime. Accordingly, it would be useful to provide a filter installation device that can reduce the time spent on removing and reinstalling the filter elements. Additionally, it would be useful to provide a device to solve the aforementioned problem without a major modification in the overall design of the filter elements.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a filter installation arrangement for a filter element extending along a longitudinal axis. The filter element includes an end cap disposed at an end of the filter element. The arrangement includes a stop device extending through the end cap such that the end cap is axially movable with respect to the stop device. The arrangement includes an adjustment device for axially displacing the end cap of the filter element in a first direction relative to the stop device. The arrangement includes an insert portion inserted to engage the stop device and located adjacent the end cap subsequent to the axial displacement of the end cap. The insert portion is configured to limit axial displacement of the end cap in a second direction that is opposite the first direction.

In accordance with another aspect, the present invention provides a filter assembly that includes a filter element extending along a longitudinal axis. The filter element includes an end cap disposed at an end of the filter element. The filter assembly includes a stop device extending through the end cap such that the end cap is axially movable with respect to the stop device. The filter assembly includes an insert portion inserted to engage the stop device and located adjacent the end cap subsequent to axial displacement of the end cap. The insert portion is configured to be supported by the stop device and limit axial movement of the end cap of the filter element.

In accordance with another aspect, the present invention provides a method of installing a filter assembly to a partition. The method includes mounting a filter element on the partition. The filter element includes an end cap disposed at an end of the filter element. The method includes displacing the end cap axially in a first direction towards the partition. The method includes positioning an insert portion adjacent the end cap subsequent to axial displacement such that the insert portion prevents the end cap and filter element from moving axially in a second direction that is opposite the first direction.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

Figure 1:
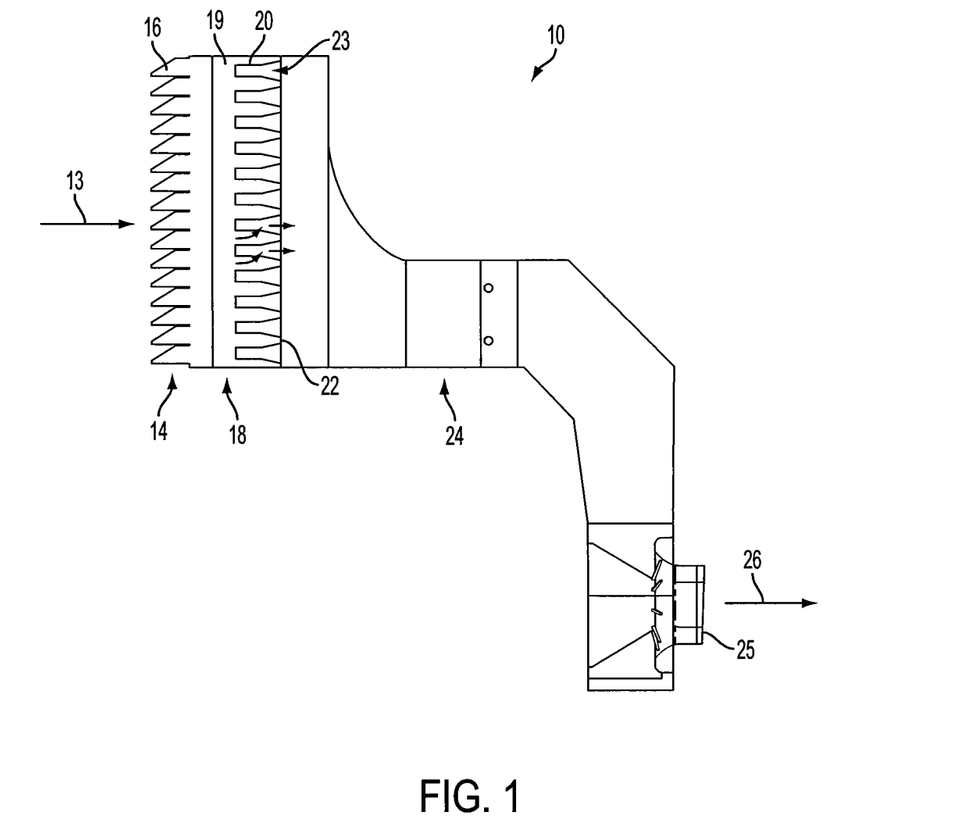
FIG. 1 is a schematized cross-section view of an example inlet system including an example filter assembly in accordance with an aspect of the present invention.

FIG. 1 schematically illustrates an example inlet system 10 for delivering a fluid (e.g., air) flow to a device, such as a gas turbine, according to one aspect of the invention. In short summary, an entering fluid flow 13 can be drawn from an exterior location and into the inlet system 10. The entering fluid flow 13 can enter a filter section 18 and passes through one or more filter assemblies 20. The fluid flow can be filtered by the filter assemblies 20 before passing through an outlet section 24 and exiting through an outlet 25.

The inlet system 10 can include an inlet section 14. It should be appreciated that the inlet section 14 is somewhat generically shown within FIG. 1. This generic representation is intended to convey the concept that the inlet section 14 of the inlet system 10 shown in FIG. 1 can represent a known construction or a construction in accordance with one or more aspects of the present invention as will be described below.

The inlet section 14 can be positioned at an upstream location of the inlet system 10. The inlet section 14 can define an open area through which the entering fluid flow 13 can enter the inlet system 10.

The inlet section 14 can include one or more hoods 16. The hoods 16 can provide a shielding function to help protect the inlet system 10 from ingesting at least some materials and/or precipitation that may otherwise enter the inlet section 14. Examples of such materials that the hoods 16 can shield from ingestion can include, but are not limited to, rain, snow, leaves, branches, animals, dust, particulates, etc. The hoods 16 extend outwardly from the inlet section 14. Of course, the hoods 16 are not limited to the shown example, and can take on a number of different sizes, shapes, and configurations. Moreover, the hoods 16 can be designed to withstand some amount of impact force from the materials and/or precipitation. For example, the hoods 16 can withstand heavy precipitation, such as a heavy rain, wind, or snow accumulation, without breaking while still reducing the amount of precipitation that enters the inlet section 14.

The example inlet system 10 can further include a filter section 18 positioned adjacent, and downstream from, the inlet section 14. The filter section 18 can be in fluid communication with the inlet section 14, such that the filter section 18 can receive the entering fluid flow 13 from the inlet section 14. The filter section 18 defines a chamber 19 that includes a substantially open area. The chamber 19 can be substantially hollow such that fluid can enter and flow through the chamber 19.

The filter section 18 can further include one or more filter assemblies 20 positioned within the chamber 19. The filter assemblies 20 are shown to extend substantially horizontally within the filter section 18 and can be arranged in a vertically stacked orientation (i.e., one filter assembly above another filter assembly). However, in other examples, the filter assemblies 20 can be arranged in a vertically staggered position, such that a filter assembly 20 is not positioned directly above or below an adjacent filter assembly. The filter assemblies 20 can be positioned adjacent a bottom wall of the filter section 18 at a lower location. The filter assemblies 20 can be substantially evenly spaced apart from adjacent filter assemblies in the vertically stacked orientation upwards towards a top wall. In further examples, the filter assemblies 20 may not be evenly spaced apart in the vertical direction, such that some filter assemblies are closer or farther apart from adjacent filter assemblies than others. Similarly, the filter assemblies 20 can be arranged to be horizontally spaced apart, such that the filter assemblies 20 can extend across the filter section 18 in a column-like formation. It is to be understood that the filter assemblies 20 are somewhat generically shown, and that the inlet system 10 could include a greater or fewer number of filter assemblies than in the shown example.

The filter assemblies 20 can each be attached to a partition 22 that is positioned at a downstream location of the filter section 18. The partition 22 can include a substantially vertically oriented wall that extends across the filter section 18 in a direction substantially perpendicular to a fluid flow direction. Specifically, the partition 22 can extend from the bottom wall towards the top wall and between opposing side walls of the filter section 18. The partition 22 can include a substantially non-porous structure, such that fluid flow is reduced and/or prevented from flowing through the partition 22. The partition 22 can further include one or more apertures 23 extending through the partition 22. The apertures 23 define openings through which the fluid flow can exit the filter section 18. As such, each of the filter assemblies 20 can be attached to surround an aperture 23. The entering fluid flow 13 can therefore pass through the filter assemblies 20 prior to passing through the apertures 23 and exiting the filter section 18. After exiting the filter section 18, the fluid can pass through the outlet section 24 and through the outlet 25, whereupon the fluid exits the outlet 25 as exiting fluid flow 26. Of course, the example shown in FIG. 1 should not be considered to be a limitation upon the present invention.

Figure 2:
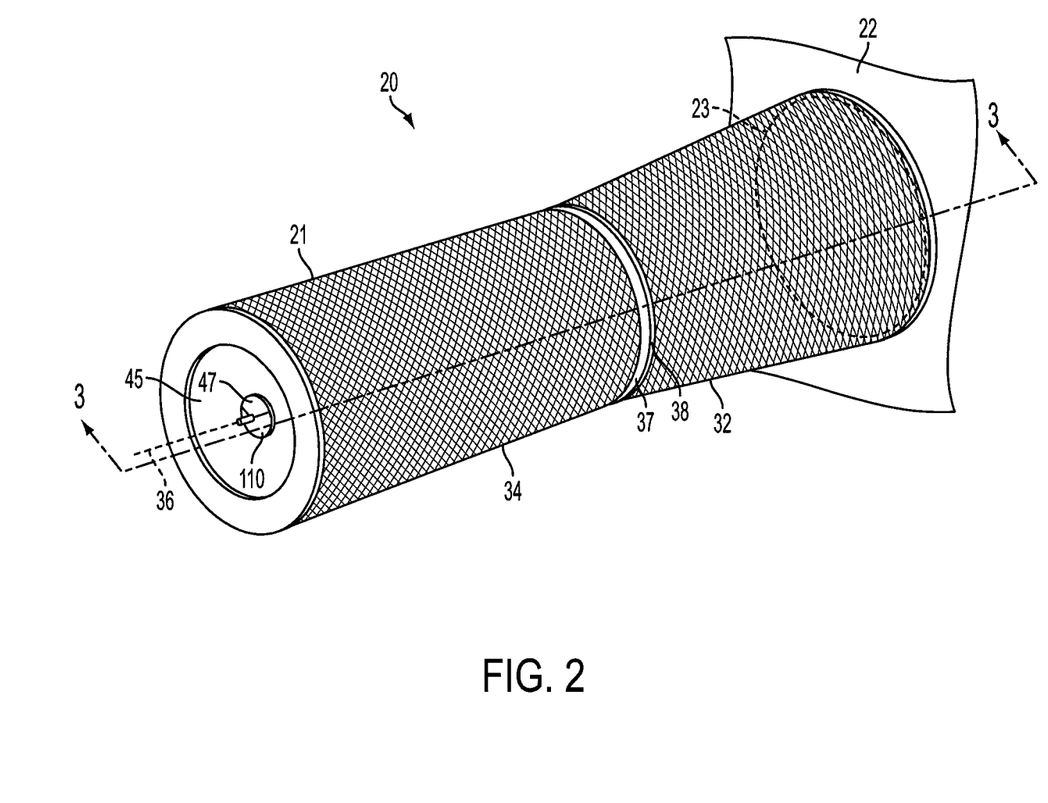
FIG. 2 is a perspective view of the example filter assembly mounted upon an example partition in accordance with an aspect of the present invention.
Figure 3:
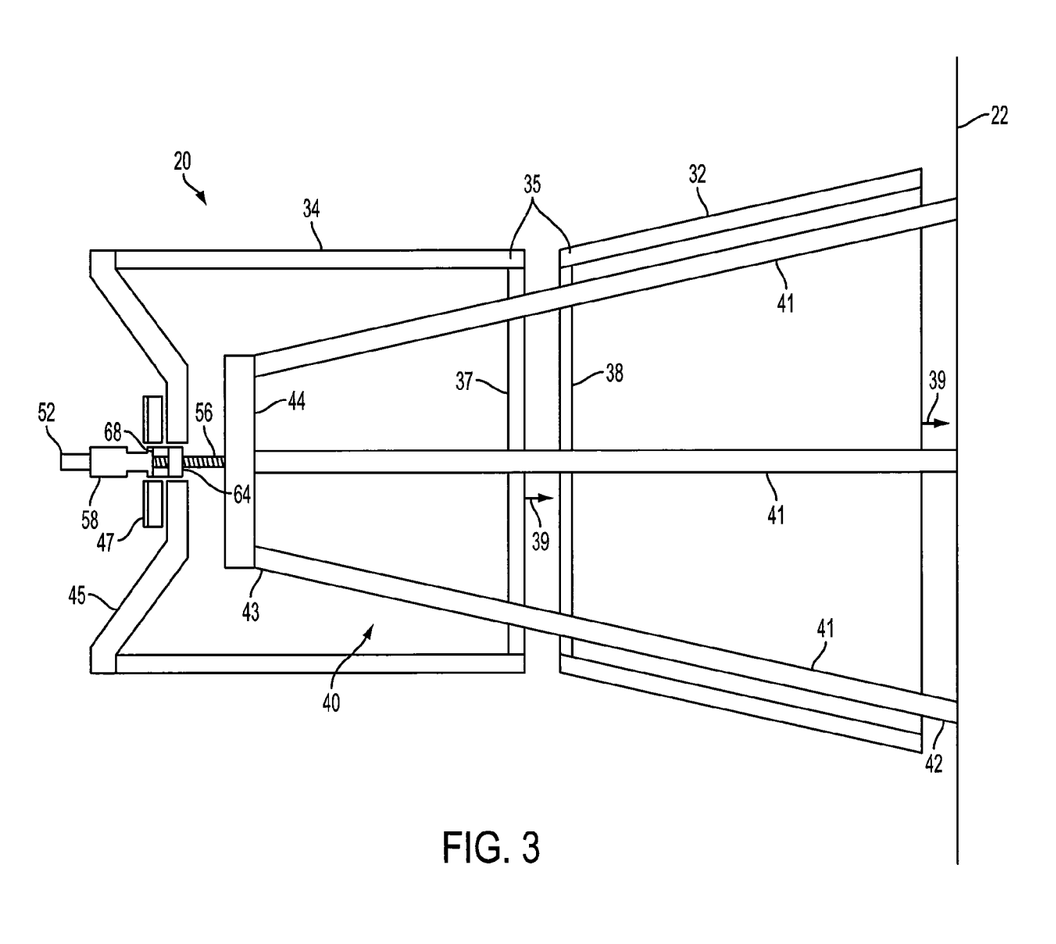
FIG. 3 is a sectional view taken along line 3-3 of FIG. 2.

Referring now to FIGS. 2 and 3, one example of the filter assembly 20 is shown. As shown in FIG. 2, a single filter assembly 20 is schematically depicted as attached to a section of the partition 22. It is to be understood that the filter assembly 20 and partition 22 are somewhat generically depicted in FIG. 2, and could take on a variety of constructions in accordance with one or more aspects of the present invention. For instance, the remaining filter assemblies can be similar and/or identical to the filter assembly 20 in the shown example or, in the alternative, could take on a number of different sizes and shapes, or different numbers of 1, or 2, or 3 filters on a single assembly. As such, the filter assembly 20 and partition 22 need not be limiting upon the present invention.

The example filter assembly 20 includes a filter element 21 that can filter the entering fluid flow 13 as it passes through the filter element 21. The example filter element 21 can define an elongated substantially cylindrically shaped structure having a conically shaped section 32. The conically shaped section 32 can include a truncated conical shape wherein a base of the conically shaped section 32 is attached to the partition 22. The base of the conically shaped section 32 can be attached to the partition 22 in a number of ways, including, but not limited to, seals, adhesives, mechanical fasteners, snap fit means, or the like. As such, nearly any type of attachment structure can function to connect the conically shaped section 32 to the partition 22. The base of the conically shaped section 32 can have a diameter that substantially matches or is slightly larger than a diameter of the aperture 23 (shown only in phantom with FIG. 2, as aperture 23 is not normally visible in such a view). The conically shaped section 32 can be attached to the partition 22 at one end and can extend along a longitudinal axis 36 in a direction away from the partition 22. The conically shaped section 32 can be tapered in a direction along the longitudinal axis 36 away from the partition 22, such that the conically shaped section 32 has a gradually decreasing diameter. It is to be understood, however, that in further examples, the filter element 21 is not limited to including the conically shaped section 32. Rather, the filter element 21 could include filter elements having a variety of shapes and sizes, such as a cylindrical shape, a trapezoidal shape, etc., that could replace the conically shaped section 32.

The example filter element 21 can further include a cylindrically shaped section 34. The cylindrically shaped section 34 can be positioned adjacent an end of the conically shaped section 32. The cylindrically shaped section 34 can extend coaxially with the conically shaped section 32 along the longitudinal axis 36. The cylindrically shaped section 34 can include a substantially constant diameter along the longitudinal axis 36. In further examples, it is to be understood that the cylindrically shaped section 34 could take on a number of different shapes and sizes, and need not be limited to the example shown in FIG. 2. Instead, the cylindrically shaped section 34 could include a conically shaped structure that is tapered, trapezoidal, etc.

Referring now to FIG. 3, a sectional view of the filter assembly 20 is shown taken along line 3-3 of FIG. 2. It is to be appreciated that FIG. 3 is an exploded view of the filter assembly 20 for illustrative purposes to show the structural relationship between components of the filter assembly 20 and the partition 22. It is to be understood, however, that in operation, the filter assembly 20 is in a fully assembled state, with the filter element 21 attached to the partition 22 in a similar manner as shown in FIG. 2. In addition, the filter assembly 20 can include a number of sizes and dimensions, and is not limited to the example shown in FIG. 3.

The filter element 21 can include a filter media 35 arranged within each of the conically shaped section 32 and cylindrically shaped section 34. The filter media 35 can be arranged along a tubular orientation to circumferentially encircle the filter element 21. As is generally known, the filter media 35 can be arranged between a scrim and a support device in a pleated orientation. The filter media 35 can be formed of a number of different materials. For instance, the filter media 35 can include a variety of filtering materials that function to remove particulates from fluid that passes through the filter media 35. The filter media 35 can also include a hydrophobic or oleophobic media. In further examples, the filter media 35 could include a layer or coating of hydrophobic media deposited on either or both of an inner and an outer surface of the filter media 35. In one example, the filter media 35 can include polytetrafluoroethylene (PTFE) or expanded polytetrafluoroethylene (ePTFE). However, a variety of materials are contemplated that can function to limit and/or prevent the passage of liquid through the filter media 35. As such, the filter media 35 can reduce and/or prevent the passage of target particulates from fluid while simultaneously reducing and/or preventing the passage of liquid through the filter media 35.

The filter element 21 can further include attachment caps 37, 38. The attachment caps 37, 38 can contact each other when the conically shaped section 32 and cylindrically shaped section 34 are brought together (shown in FIG. 2). The conically shaped section 32 can include a first attachment cap 37 positioned at an end while the cylindrically shaped section 34 can include a second attachment cap 38 positioned at an end. Each of the first attachment cap 37 and second attachment cap 38 can define a substantially circular structure having an internal bore extending therethrough. In operation, the conically shaped section 32 and cylindrically shaped section 34 can be attached in the assembled position (shown in FIG. 2), with the attachment caps 37, 38 contacting each other and forming a seal. The attachment caps 37, 38 can limit or eliminate fluid flow that passes between the conically shaped section 32 and cylindrically shaped section 34 from an exterior of the filter element 21 to an interior of the filter element. As such, fluid flow is more likely to flow through either of the conically shaped section 32 or the cylindrically shaped section 34. In further examples, the attachment caps 37, 38 could also include a sealing material, such as an elastomer-like material, that can form a seal between the attachment caps 37, 38, thereby reducing the passage of fluid between the attachment caps. Similarly, as is generally known, one or both of the attachment caps 37, 38 can include mating structures, such as projections, grooves, or the like, that can allow the attachment caps 37, 38 to non-movably contact each other. Of course, it is to be understood that the attachment caps 37, 38 can include any number of configurations, some of which may be generally known, such that the attachment caps 37, 38 are not limited to the examples shown in FIG. 3.

The filter element 21 can further include a support end cap 45. The support end cap 45 can function to block an end of the cylindrically shaped section 34. The support end cap 45 can be positioned at an end of the filter element 21 opposite from the partition 22. The support end cap 45 is shown to be circular in shape, though a variety of sizes and shapes are contemplated, such as polygonal shapes, or the like. The support end cap 45 is depicted as a non-planar structure having a center projecting inwardly in an axial direction towards the partition 22. However, it is to be understood, that in further examples, the support end cap 45 could be substantially planar, and may extend in a straight direction. The support end cap 45 can further include an opening extend axially through the support end cap 45 through which a support portion, or the like, can extend.

Referring still to FIG. 3, the filter assembly 20 can further include a support structure 40. The support structure 40 can be attached to the partition 22 and can be positioned to extend longitudinally within the conically shaped section 32 and cylindrically shaped section 34. The support structure 40 can provide internal support for the conically shaped section 32 and cylindrically shaped section 34.

The support structure 40 can include a plurality of support legs 41. While the shown example includes three support legs, it is to be understood that more or fewer support legs are envisioned. The support legs 41 can be attached at a first end 42 to the partition 22. The support legs 41 can be attached in any number of ways that are generally known in the art, such as by mechanical fastening devices, adhesives, snap fit devices, welding or the like. The support legs 41 can be removably or non-removably attached to the partition 22. It is to be understood that the support legs 41 are somewhat generically/schematically shown in FIG. 3, and could include a number of different sizes and shapes in further examples. For instance, the support legs 41 could be longer or shorter in length, could include a wider cross-section, or the like. The support structure 40 can be slightly tapered and can have a generally conically shaped orientation. For instance, the support legs 41 can be angled towards each other in a direction away from the partition 22. As such, the support legs 41 can be closer together at a second end 43 that is opposite the first end 42.

The support structure 40 can further include a support portion 44. The support portion 44 can be positioned at the second end 43 of the support legs 41. The support portion 44 can provide an attachment location for the support legs 41 opposite from the partition 22. The support portion 44 can be attached to the support legs 41 such that the support legs 41 are substantially non-movable at the second end 43. The support portion 44 can be attached to the support legs 41 in any number of ways, including, but not limited to, welding, mechanical fasteners, adhesives, threading attachment, snap fit means, or the like. It is to be understood that the support portion 44 can include a number of different structures that have a similar function, and is not limited to the examples shown and described herein.

Figure 4:
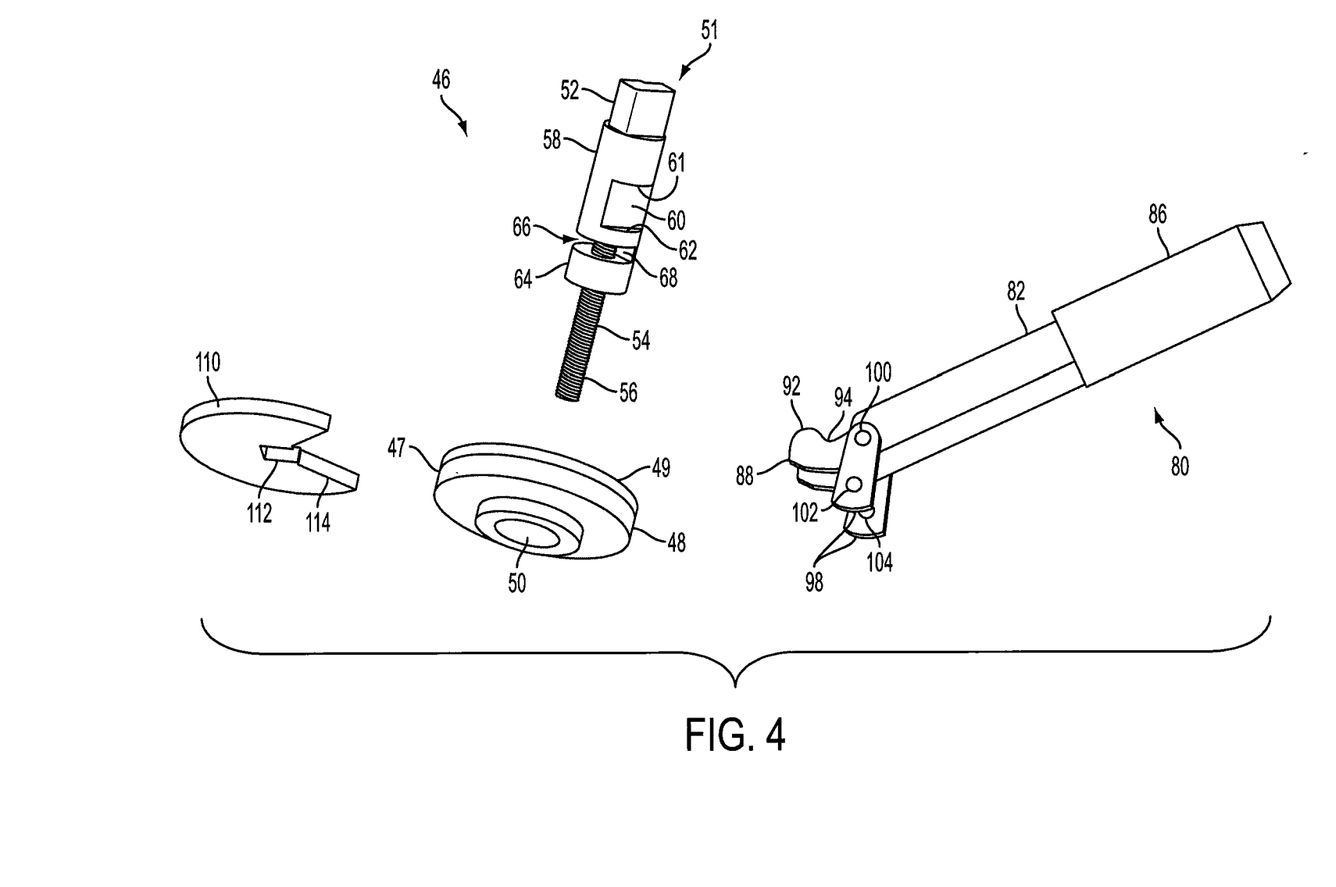
FIG. 4 is an exploded perspective view of portions of an example filter installation arrangement.

Referring now to FIG. 4, a filter installation arrangement 46 can be provided to secure the filter element 21 to support structure 40 and thus to the partition 22. It is to be appreciated that FIG. 4 depicts an exploded view of the filter installation arrangement 46 for illustrative purposes to show the structural relationship between different components within the filter installation arrangement 46. It is to be understood, however, that in operation, the filter installation arrangement 46 can be in a fully assembled state in a manner similar to the example shown in FIG. 3. The filter installation arrangement 46 can axially displace the conically shaped section 32 and cylindrically shaped section 34 towards the partition 22.

The filter installation arrangement 46 can include an end cap plug 47. The end cap plug 47 can be positioned adjacent the support end cap 45 (see FIG. 3). In one example, the end cap plug 47 can be movable with respect to the support end cap 45, such that the end cap plug 47 can be replaced. In other examples, however, the end cap plug 47 could be attached to the support end cap 45. It is to be understood, however, that the end cap plug 47 is somewhat generically shown in FIGS.

3 and 4, and is not limited to the depicted structure. Rather, the end cap plug 47 could include any number of sizes, shapes, and configurations.

The end cap plug 47 can include a flexible layer 48. The flexible layer 48 can contact the support end cap 45 (shown in FIG. 2). The flexible layer 48 can include a number of flexible, deformable materials. For instance, the flexible layer 48 can include an elastomeric material, which comprises a number of different polymeric materials, such as synthetic rubber or plastic. In further examples, the flexible layer 48 could comprise ethylene-propylene-diene-monomer (EPDM), however, any number of materials are envisioned. The flexible layer 48 can at least partially compress when an axial force is applied on the end cap plug 47. As such, the flexible layer 48 can form a seal with the support end cap 45, thus limiting the passage of fluid through the end cap plug 47.

The end cap plug 47 can further include a support layer 49. The support layer 49 can be attached to a distal side of the flexible layer 48 that is opposite from the support end cap 45. The support layer 49 can provide a relatively rigid supporting surface to the flexible layer 48. The support layer 49 could comprise a number of different materials, including, but not limited to, metal-like materials including stainless steel, plastic materials, or the like. The support layer 49 can be attached to the flexible layer 48 in a number of ways, including by an adhesive attachment. While both of the support layer 49 and flexible layer 48 are shown to have a generally circular shape, it is to be understood that the support layer 49 and flexible layer 48 could further include other sizes and shapes, such as a rectangular shape, oval shape, or the like. Moreover, the support layer 49 and flexible layer 48 could have a larger or smaller thickness or diameter than in the shown example.

The end cap plug 47 can include an opening 50 extending through both of the flexible layer 48 and support layer 49. The opening 50 can project completely through the end cap plug 47 from a first end to an opposing second end of the end cap plug 47. The opening 50 can be axially aligned with the opening in the support end cap 45, such that the opening 50 defines a passage from an interior to an exterior of the filter element 21. The opening 50 can be larger or smaller than the opening shown in FIG. 4, and is not limited to the shown examples. While shown as a substantially circular opening, it is to be understood that the opening 50 could include any number of shapes, such as a rectangular opening, or the like.

Referring still to FIG. 4, the filter installation arrangement 46 can further include a stop device 51. The stop device 51 is shown in a detached state in FIG. 4 for illustrative and clarity purposes. However, it is to be understood that in a fully assembled state, the stop device 51 can be attached to the support portion 44, as shown in FIG. 3.

The stop device 51 can include a rod 54 with a threaded portion 56 for attaching the stop device 51 to the support portion 44. The rod 54 can extend at least partially along the length of the stop device 51 or, as shown, can be threaded all the way up and into the stop 51 and possibly past the first groove end 61. The threaded portion 56 can be received by a corresponding female threaded portion (not shown) in the support portion 44. As such, the threaded portion 56 can function to attach the stop device 51 to the support portion 44. Of course, it is to be understood that the stop device 51 is not limited to a threading attachment, and could include any number of attachment means other than a threading engagement, such as mechanical fasteners, welding, or the like. Accordingly, the stop device 51 can be attached to the support portion 44 in any number of ways, and is not limited to including the threaded portion 56.

The stop device 51 can further include a support portion 52 threaded upon the rod 54. The support portion 52 can be positioned on an opposite end of the stop device 51 from the threaded portion 56 on the rod 54. The support portion 52 can be a unitary, monolith structure being formed from a single piece of material. The stop device 51 can be constructed of plural pieces combined together. Within the shown example, a portion of the rod 54 extends into the support portion 52 and an end of the support portion can serve as a drive engagement portion so that the threaded portion 56 may be drivingly threaded into the female threads within the support portion 44.

The support portion 52 of the stop device 51 can extend in a direction away from the support portion 44 of the support structure 40. In the shown example, the support portion 52 can provide a larger cross-sectional thickness than the rod 54. However, it is to be understood that the support portion 52 can include any number of sizes and shapes, and is not limited to the size shown in FIG. 4. The stop device 51 can extend through the opening in the end cap 45, such that the stop device 51 extends from an interior portion of the cylindrically shaped section 34 to an exterior portion of the cylindrically shaped section 34. Moreover, the opening in the end cap 45 can be sized such that the support portion 52 can extend there through. Also, the support portion 52 can have a maximum diameter that is smaller than a cross-sectional diameter of the opening 50 in the end cap plug 47. Accordingly, as will be explained in more detail below, the end cap plug 47 can freely move with respect to the support portion 52 without the support portion 52 engaging and/or contacting either of the end cap plug 47 or edges of the opening 50.

The support portion 52 can be considered to provide a detent structure. In one example, the detent structure can include a first detent structure 58 and a second detent structure 64. The first detent structure 58 can be disposed along the rod 54 spaced away from the threaded portion 56. The first detent structure 58 can include a cross-sectional width that is larger than a cross-sectional width of the rod 54. For example, the first detent structure 58 shown in FIG. 4 can define a generally cylindrically shaped structure, with the diameter of the first detent structure 58 being larger than a diameter of the rod 54. In further examples, however, the first detent structure 58 is not limited to having a cylindrically shaped structure. Rather, the first detent structure 58 could define nearly any shaped structure that has a larger cross-sectional width than the rod 54.

The first detent structure 58 can further include one or more adjustment grooves 60. The adjustment grooves 60 can define a portion of the first detent structure 58 having a reduced cross-sectional width as compared to the remainder of the first detent structure 58. Each adjustment groove 60 can extend longitudinally partially along the length of the first detent structure 58 between a first groove end 61 and a second groove end 62. As such, each adjustment groove 60 can define a smaller cross-sectional width than the first groove end 61 and second groove end 62. Each adjustment groove 60 is shown as a substantially rectangular shaped indent formed at opposing sides of the first detent structure 58. However, it is to be understood that each adjustment groove 60 could include a number of sizes and shapes that have a similar function. For instance, a single adjustment groove 60 could extend completely around the first detent structure 58 as opposed to two grooves being formed only on opposing sides. Similarly, a single adjustment groove 60 could extend around three sides of the first detent structure 58, as opposed to opposing sides.

The second detent structure 64 can be disposed on the rod 54 and threaded portion 56. The second detent structure 64 can be spaced apart a distance from the first detent structure 58. The second detent structure 64 can include a cross-sectional width that is larger than a cross-sectional width of the rod 54. In one example, the second detent structure 64 can include a cross-sectional width that is roughly equivalent to the cross-sectional width of the first detent structure 58. However, it is to be understood that the second detent structure 64 could be larger or smaller in cross-sectional width. In the shown example, the second detent structure 64 can define a generally cylindrically shaped structure, such that the diameter of the second detent structure 64 is larger than a diameter of the rod 54. However, in further examples, the second detent structure 64 is not limited to having a cylindrically shaped structure, and could define nearly any shaped structure that has a larger cross-sectional width than the rod 54.

The stop device 51 can further include a stop opening 66 positioned between the first detent structure 58 and second detent structure 64. The stop opening 66 can extend longitudinally along the length of the support portion 52. The rod 54 can extend through the stop opening 66, with the rod 54 having a smaller diameter than each of the first detent structure 58 and second detent structure 64.

The stop opening 66 can further include a sealing wall 68. The sealing wall 68 can extend between the first detent structure 58 and second detent structure 64. The sealing wall 68 can be attached to either or both of the first detent structure 58 and second detent structure 64. The sealing wall 68 can extend parallel to the rod 54 along an edge of the stop opening 66. The sealing wall 68 can extend partially, circumferentially around an outer edge of the stop opening 66. In the shown example, the sealing wall 68 extends only a small distance around the outer edge of the stop opening 66. However, the sealing wall 68 could extend a longer or shorter circumferential distance. Similarly, in further examples, the sealing wall 68 could be positioned radially closer to the rod 54 at a center of the stop opening 66. As such, the sealing wall 68 could include a number of different sizes and shapes, and is not limited to the example of FIG. 4.

Figure 5:
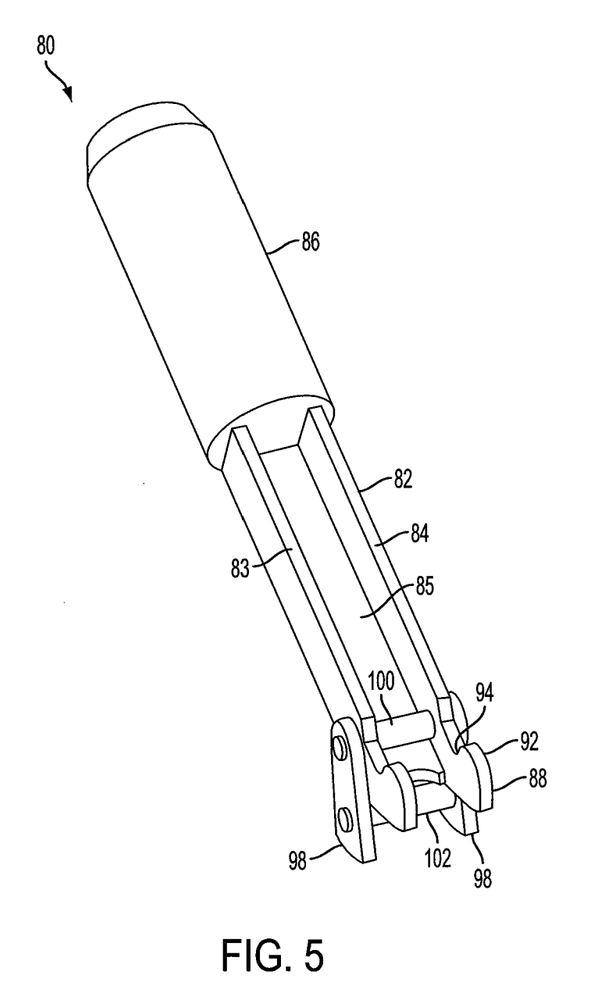
FIG. 5 is a perspective view of an example adjustment device of the filter installation arrangement of FIG. 4.

Referring now to FIGS. 4 and 5, the filter installation arrangement 46 can further include an adjustment device 80. The adjustment device 80 can selectively engage both of the end cap plug 47 and stop device 51 to axially displace the end cap plug 47. As such, the adjustment device 80 can comprise one possible example of an adjustment means for axially displacing the end cap plug 47 of the filter element 21.

The adjustment device 80 can include a shaft portion 82. The shaft portion 82 can extend along a longitudinal axis between opposing ends. The shaft portion 82 can comprise a first shaft wall 83 and a second shaft wall 84 (shown more clearly in FIG. 5). The first shaft wall 83 and second shaft wall 84 can be attached by a connecting wall 85 that extends longitudinally between the first shaft wall 83 and second shaft wall 84. Specifically, the connecting wall 85 can extend substantially perpendicularly to the first shaft wall 83 and second shaft wall 84. It is to be understood, however, that the connecting wall 85 can be attached to the first shaft wall 83 and second shaft wall 84 in a number of ways, and is not limited to the examples shown. Rather, the connecting wall 85 could be welded to either or both of the first shaft wall 83 and second shaft wall 84. In the alternative, the connecting wall 85 could be integrally formed with the first shaft wall 83 and second shaft wall 84, such that the first shaft wall 83 and second shaft wall 84 comprise bent ends of the connecting wall 85.

In further examples, the shaft portion 82 is not limited to including the first shaft wall 83, second shaft wall 84, and connecting wall 85. Rather, the shaft portion 82 could include a number of different configurations. In one example, the shaft portion 82 could include only one shaft wall, or more than two shaft walls. Similarly, the shaft portion 82 may not include a connecting wall 85. Even further, the shaft portion 82 could include a rod-like structure that forms the shaft portion 82. Accordingly, it is to be understood that the shaft portion 82 shown in the examples is merely one possible arrangement, and could further include a number of different sizes and structures that function in a similar manner.

The shaft portion 82 can further include a handle portion 86 disposed at a distal end of the shaft portion 82. The handle portion 86 could be formed of a variety of materials that are relatively soft and/or provide a frictional surface that a user can grip. In operation, a user can grip the handle portion 86 to manipulate the shaft portion 82. Of course, the shaft portion 82 is not limited to including the handle portion 86 example shown in FIG. 4, and, instead, could include nearly any type of structure that a user can grip. In further examples, the shaft portion 82 need not necessarily include the handle portion 86, as a user could instead directly grip the shaft portion 82.

The shaft portion 82 can further include an adjustment end 88 positioned at an end of the shaft portion 82. Specifically, the adjustment end 88 can be formed at the ends of the first shaft wall 83 and second shaft wall 84. The adjustment end 88 can include a contact portion 92. The contact portion 92 can define an upper surface of the adjustment end 88. The contact portion 92 can include a rounded, circular shaped upwardly projecting protrusion. In further examples, the contact portion 92 could include a number of different sizes and shapes, and is not limited to the rounded, circular shape of the shown examples. Instead, the contact portion 92 could include a square shape having edge portions, or the like.

The adjustment end 88 can further include an indent portion 94 positioned adjacent the contact portion 92. The indent portion 94 can define an upper surface of the adjustment end 88. The indent portion 94 can be positioned between the contact portion 92 on one side and the shaft portion 82 on an opposing side. The indent portion 94 can form a relatively smooth valley portion adjacent the contact portion 92. In one example, the indent portion 94 can form a rounded concave indent. As will be described in more detail below, the indent portion 94 can allow for the adjustment end 88 to freely rotate, without the indent portion 94 contacting a surface and/or blocking the adjustment end 88 from moving.

The adjustment device 80 can further include adjustment legs 98. The adjustment legs 98 can define a pair of substantially planar members extending downwardly from the shaft portion 82. The adjustment legs 98 can be spaced apart from each other to define a gap formed therebetween, wherein the width of the gap is slightly larger than a maximum width of the shaft portion 82. Accordingly, the adjustment legs 98 can be positioned on opposing outside surfaces of the shaft portion 82, such that the shaft portion 82 can extend between the adjustment legs 98. The adjustment legs 98 are shown to be generally rectangular shaped having slightly rounded ends. However, it is to be understood that the adjustment legs 98 can include a variety of different structures, sizes, and shapes, and are not limited to the shown examples.

The adjustment device 80 can further include a pivot axle 100 extending between the adjustment legs 98 across the gap. The pivot axle 100 can be attached at opposing ends to the adjustment legs 98, such that the pivot axle 100 extends substantially perpendicularly to the adjustment legs 98. The pivot axle 100 can be attached at opposing ends to the adjustment legs 98 in any number of ways. In one example, the pivot axle 100 can move, such as by rotating or pivoting, with respect to the adjustment legs 98. As such, the pivot axle 100 can be rotatably attached to the adjustment legs 98 with the pivot axle being allowed to pivot. In another example, the pivot axle 100 could be fixedly attached to the adjustment legs 98, such that the pivot axle 100 does not move with respect to the adjustment legs 98.

The pivot axle 100 can be attached to the shaft portion 82 and can allow the shaft portion 82 to move with respect to the adjustment legs 98. The pivot axle 100 can extend along an axis that is substantially perpendicular in direction to the first and second shaft walls 83, 84. The pivot axle 100 defines a rotational axis about which the shaft portion 82 and adjustment end 88 can rotate. In one example, the pivot axle 100 can extend through openings, apertures, or the like formed in the first shaft wall 83 and second shaft wall 84. However, the shaft portion 82 can be attached to the pivot axle 100 in a number of ways. For instance, the pivot axle 100 can be fixedly attached to the shaft portion 82, such that rotation of the shaft portion 82 can cause the pivot axle 100 to rotate as well. In another example, the pivot axle 100 could be fixedly attached to the adjustment legs 98, such that the shaft portion 82 can rotate with respect to the non-movable adjustment legs.

The adjustment legs 98 can further include a support axle 102 extending between the adjustment legs 98. The support axle 102 can be attached at opposing ends to the adjustment legs 98, such that the support axle 102 extends substantially perpendicularly to the adjustment legs 98. The support axle 102 can function to attach the adjustment legs 98 to each other while allowing the adjustment legs 98 to maintain a constant distance apart. Moreover, the support axle 102 can limit the adjustment legs 98 from freely rotating and/or misaligning, thus allowing the adjustment legs 98 to remain substantially parallel to each other. The support axle 102 can extend in a substantially parallel direction as the pivot axle 100, and can be spaced apart a distance from the pivot axle 100 (i.e., by being positioned lower than the pivot axle 100). The support axle 102 can be attached to the adjustment legs 98 in any number of ways. In one example, the support axle 102 can pass through opening in each of the adjustment legs 98, with the support axle 102 being fixedly attached to each of the adjustment legs 98. However, it is to be understood, that any number of attachment methods are envisioned. The adjustment legs 98 are also not limited to the support axle 102 as shown Instead, nearly any type of structure could be provided that allows the adjustment legs 98 to remain a substantially constant distance apart while remaining in alignment.

The adjustment legs 98 can each include a base portion 104. The base portion 104 can be positioned at an end of the adjustment legs 98 adjacent the support axle 102. The base portion can define a slightly rounded bottom surface of the adjustment legs 98. The degree of roundness of the base portion 104 is not limited to the shown examples, and could be rounder or flatter. In operation, as will be described more below, the rounded base portion can allow the adjustment legs to slightly rotate in a forwards and backwards direction as the shaft portion 82 is pivoted about the pivot axle 100.

It is to be understood that the adjustment legs 98 shown and described herein comprise merely one possible example of a structure that allows the shaft portion 82 to rotate. As such, it is appreciated that in further examples, the adjustment legs 98 could include as few as one leg, or more than two legs. Similarly, the adjustment legs 98 could include only one axle, and need not necessarily include both the pivot axle 100 and support axle 102. Accordingly, the adjustment device 80 can include a number of different structures and configurations that allow the shaft portion 82 to freely rotate, and is not limited to the adjustment legs 98 shown in FIGS. 4 and 5.

The operation of the adjustment device 80 can be briefly explained. The adjustment device 80 can be placed on the end cap plug 47 and operated to tighten engagement of the filter assembly to the partition 22. Specifically, the base portion 104 can be positioned to engage the support layer 49. The adjustment end 88 can be inserted into the adjustment groove 60 of the support portion 52. A user can then rotate the shaft portion 82 by depressing the handle portion 86, causing the shaft portion 82 to rotate in a first pivoting direction 120 (shown in FIG. 7) about the pivot axle 100 with respect to the adjustment legs 98. As the shaft portion 82 is pivoted in the first pivoting direction 120 (i.e., towards the end cap plug 47), the adjustment end 88 can correspondingly pivot in an opposing direction (i.e., away from the end cap plug 47). This pivoting motion of the adjustment end 88 can cause the contact portion 92 to engage the first groove end 61. The first groove end 61 can limit any further free pivoting motion of the adjustment end 88, thus causing the shaft portion 82 to drive the adjustment legs 98 in the first direction 39 (i.e., towards the end cap plug 47). Since the end cap plug 47 is freely movable with respect to the support portion 52, the end cap plug 47 can be axially displaced in the first direction 39 towards the partition, thus exposing the stop opening 66. This operation provides a conversion of cantilever force to linear, axial displacement and can be considered to provide a jacking operation.

It is to be understood that the adjustment device 80 shown in FIG. 5 comprises merely one possible example of an adjustment means for axially displacing the end cap plug 47 of the filter element 21. Accordingly the adjustment means can encompass nearly any structure presently existing or developed in the future that performs the function of axially displacing the end cap plug 47. In further examples, the adjustment means may include a number of different structures that can provide axial force to the end cap plug 47 in the first direction 39. For example, the adjustment means could include a user providing a pushing force on the end cap plug 47 and/or the support end cap 45 such that the conically shaped section 32 and cylindrically shaped section 34 are moved along the first direction 39 towards the partition 22. Along these lines, the adjustment means could instead comprise nearly any lever-type device, such as a crowbar, screwdriver, or the like. In this example, the lever-type device could grip the stop device 51 and cause the end cap plug 47 to move axially towards the partition 22.

Referring still to FIG. 4, the filter installation arrangement 46 can further include an insert portion 110. The insert portion 110 can include a substantially circularly shaped structure that can be inserted into the stop opening 66. The insert portion 110 can include a width that is slightly smaller than a width of the stop opening 66 (i.e., distance between the first detent structure 58 and second detent structure 64).

The insert portion 110 can include a central opening 112. The central opening 112 is shown to be substantially square shaped and can be bounded on three sides. Of course, the central opening 112 is not limited to the shape shown in the examples, and could include other shapes, such as a partial circular shape, other quadrilateral shape, or the like. The central opening 112 can have a side length (i.e., distance between opposing sides of the central opening 112) that is larger than a diameter of the rod 54 but smaller than a diameter of either of the first detent structure 58 or second detent structure 64. As such, the central opening 112 can be inserted into the stop opening 66 such that the central opening 112 can substantially surround the rod 54 while being limited from moving axially along the length of the support portion 52 by the first detent structure 58 and second detent structure 64.

The central opening 112 is bounded on three sides, with the fourth side being radially open to an insert opening 114. The insert opening 114 defines an open sector of the insert portion 110. The insert opening 114 can vary in size. For instance, in the shown example, the insert opening 114 can comprise about ¼ of the insert portion 110, such that the insert opening 114 has a central angle of about 90°. However, in further examples, the insert opening 114 can be larger or smaller in size.

The insert portion 110 can be removably attached to the stop opening 66. Specifically, the insert portion 110 can be inserted in a second direction 122 (shown in FIG. 7) into the stop opening 66. In one example, the second direction 122 can be substantially perpendicular to the support portion 52 and first direction 39. In another example, the second direction 122 could include a direction that is substantially perpendicular to the sealing wall 68. As the insert portion 110 is inserted into the stop opening 66, the central opening 112 can engage and surround the rod 54 that extends through the stop opening 66. As the insert portion 110 is further inserted, the central opening 112 can engage and contact the sealing wall 68. Once the central opening 112 and the sealing wall 68 are engaged, a seal can be formed between the insert portion 110 and the first detent structure 58 and second detent structure 64. This seal can limit the passage of fluid (e.g., air), moisture, or the like from an exterior location and through the opening 50.

It should be appreciated that since the insert portion 110 is inserted subsequent to the adjustment device 80 operating to displace the support end cap 45 and end cap plug 47, the insert portion 110 is adjacent to the support end cap 45 and end cap plug 47, and holds the support end cap 45 and end cap plug 47 at the displaced location (i.e., displaced from original). Thus, the filter element 21 can be held tight against the partition 22. It should be appreciated that the thickness of the insert portion 110 could be varied to change or vary the amount of displacement that the insert portion 110 retains/amount of pressure that the insert portion provides against the end cap plug 47. Such, provides for possible variations. Also, it should be appreciated that since the rod 54 is threaded into the support portion 44 via the threaded portion 56, it is possible to provide adjustment via rotation of the stop device 51 to vary the about of threaded penetration and thus vary the location of the stop opening 66 and thus vary the to change or vary the amount of displacement that the insert portion 110 retains/amount of pressure that the insert portion provides against the end cap plug 47.

It should be appreciated that portions (e.g., end cap plug 47, stop device 51 and insert portion 110) of the filter installation arrangement 46 are or become parts of the respective filter assembly 20. The adjustment device 80, although part of the filter installation arrangement 46, does not necessarily become part of the filter assembly 20. As such, the filter installation arrangement 46 could be packaged for sale separate from an existing filter assembly 20 and thus be used to retrofit a pre-existing filter assembly 20 in accordance with one aspect of the present invention. For example, prior-existing threaded nut fasteners could be removed and replaced with the improvements provided by the filter installation arrangement 46 in accordance with an aspect of the present invention. Alternatively, the filter assembly 20 could be initially provided with the improvements of the filter installation arrangement 46 in accordance with another aspect of the present invention.

Figure 6:
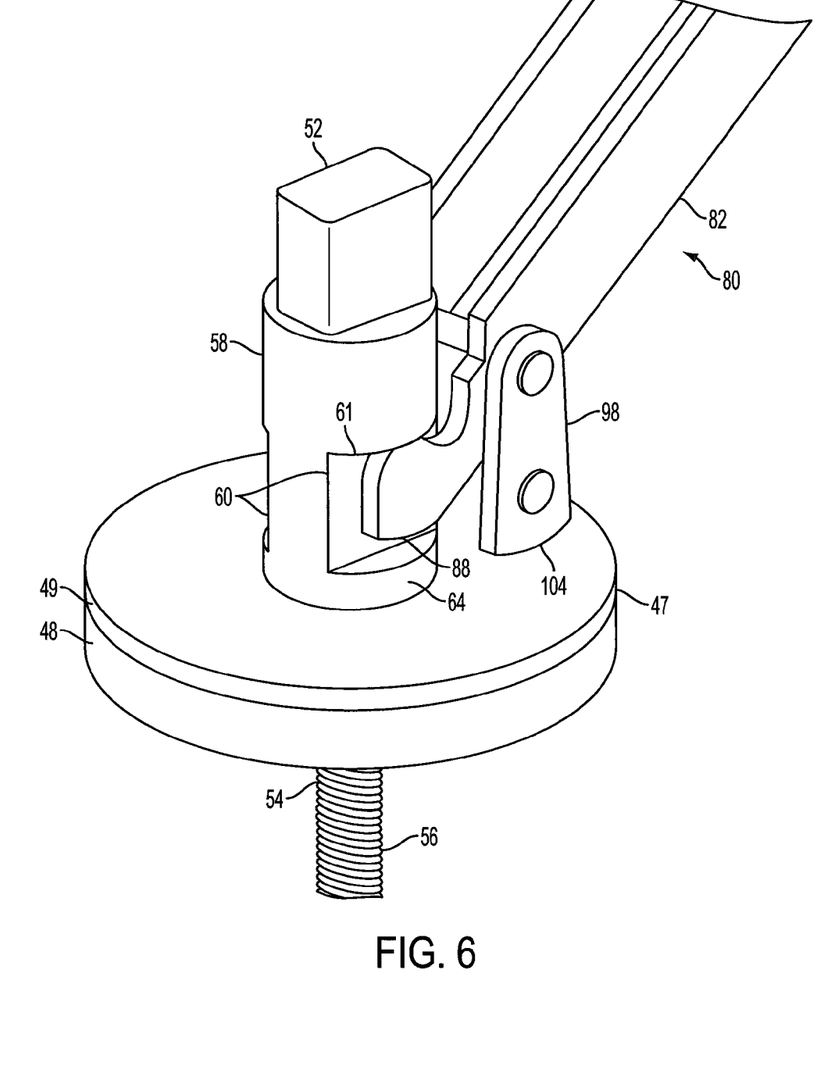
FIG. 6 is a perspective view of the example adjustment arrangement of FIG. 4 in operation, with the adjustment device engaging a support portion adjacent an end cap plug.
Figure 7:
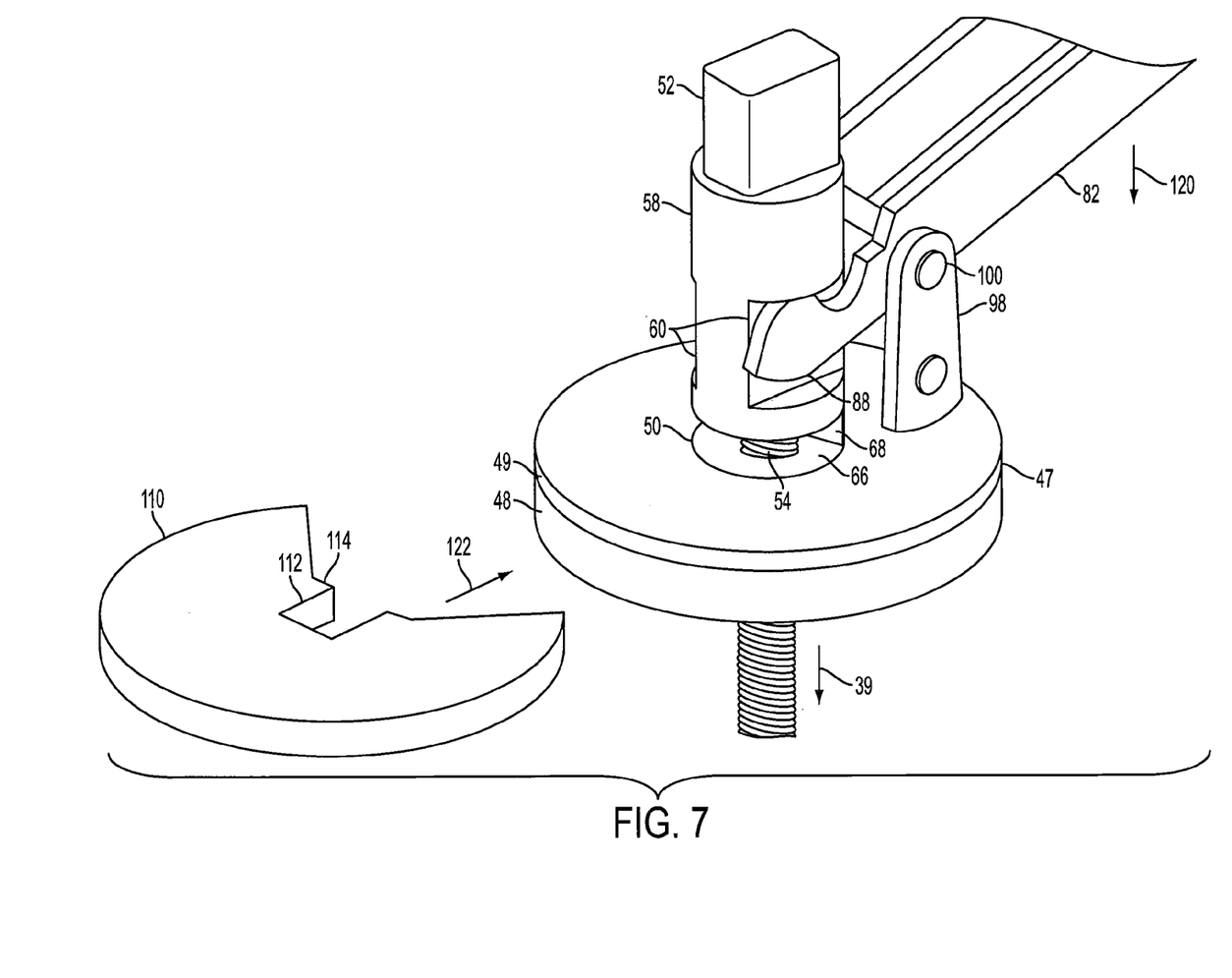
FIG. 7 is a view similar to FIG. 6, but with the adjustment device axially moving the end cap plug in a first direction and an example insert portion being positioned on the support portion.
Figure 8:
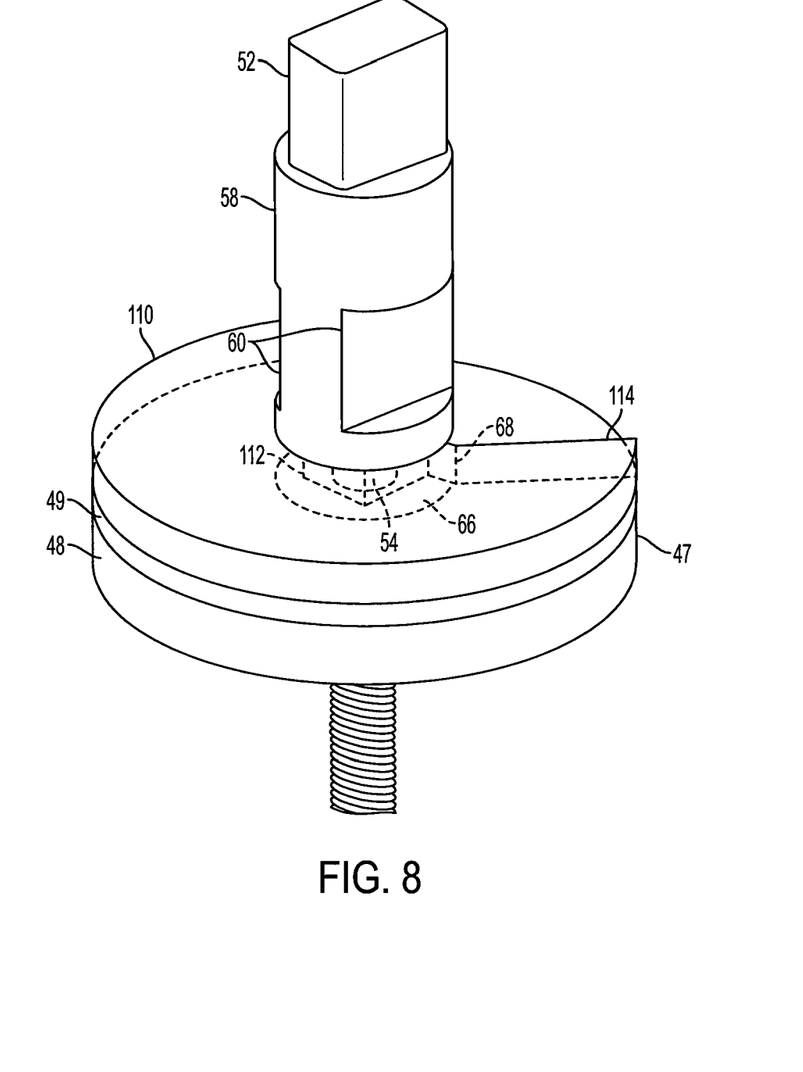
FIG. 8 is a view similar to FIG. 7, but with the insert portion attached to the support portion subsequent to axial displacement of the end cap plug and the adjustment device removed.

Referring now to FIGS. 6 to 8, the method of attaching the filter assembly 20 to the partition 22 by means of the filter installation arrangement 46 can now be explained in more detail. Initially, it is to be appreciated that FIGS. 6 to 8 depict a generic illustration of the filter installation arrangement 46 for illustrative purposes without showing the support end cap 45 or filter element 21. In particular, FIGS. 6 to 8 depict the relationship between the shaft portion 82, end cap plug 47, and stop device 51. It is to be understood, however, that in operation, the filter assembly 20 can be in a fully assembled state, with the end cap plug 47 positioned adjacent the support end cap 45 in a similar manner as shown in FIG. 2.

The filter assembly 20 can initially be mounted on the support structure 40 (shown in FIG. 3). The conically shaped section 32 can be placed on the support structure 40 before the cylindrically shaped section 34, such that the conically shaped section 32 is positioned closer to the partition 22 than the cylindrically shaped section 34. Once mounted on the support structure 40, the filter assembly 20 can initially be in a detached, disassembled state. In the detached state the filter element 21 may not be attached to the partition 22, and can include the conically shaped section 32 and cylindrically shaped section 34 being spaced apart from each other. Similarly, the conically shaped section 32 could be spaced apart from the partition 22, as shown in FIG. 3.

Referring now to FIG. 6, the adjustment device 80 can engage the first detent structure 58. The adjustment end 88 of the adjustment device 80 can be inserted into the adjustment groove 60 of the first detent structure 58. The adjustment end 88 can be oriented such that the contact portion 92 can be in contact with and/or engage the first groove end 61. The adjustment device 80 can be placed on the end cap plug 47 such that the base portion 104 is supported by the support layer 49.

Referring now to FIG. 7, the adjustment device 80 can rotate to cause axial displacement of the end cap plug 47. Axial displacement of the end cap can further cause the conically shaped section 32, and the cylindrically shaped section 34 to move axially in the first direction 39 as well. The shaft portion 82 of the adjustment device 80 can be rotated in the first pivoting direction 120, such as by a user depressing the handle portion 86. The shaft portion 82 can act as a lever and can pivot about the pivot axle 100, with the pivot axle 100 acting as a fulcrum. The adjustment end 88 of the shaft portion 82 can engage the first groove end 61 of the support portion 52. Due to the attachment of the support portion 52 to the support structure 40, the support portion 52 is limited from moving axially. Accordingly, as the shaft portion 82 continues to rotate in the first pivoting direction 120 with the adjustment end 88 remaining in contact with the adjustment groove 60, the adjustment legs 98 can be driven in the first direction 39 towards the end cap plug 47. Continued rotation of the shaft portion 82 can cause the end cap plug 47, conically shaped section 32, and the cylindrically shaped section 34 to axially move in the first direction 39 with respect to the stationary support portion. This axial movement can push the conically shaped section 32 against the partition 22 and the cylindrically shaped section 34 against the conically shaped section 32. The end cap plug 47 can axially displace a sufficient distance such that the stop opening 66 is exposed. Once the stop opening 66 is completely exposed, rotation of the shaft portion 82 can be stopped.

Referring still to FIG. 7, once the stop opening 66 is exposed and subsequent to the axial displacement of the end cap plug 47, the insert portion 110 can be inserted into the stop opening 66. The insert portion 110 can be moved in the second direction 122. As the insert portion 110 is moved in the second direction 122, the insert portion 110 can be aligned with the stop opening 66 such that the central opening 112 faces the stop opening 66. As the insert portion 110 is inserted into the stop opening 66, the central opening 112 can engage and surround the rod 54 that extends through the stop opening 66. As the insert portion 110 is further inserted into the stop opening 66, the central opening 112 can contact the sealing wall 68. With the central opening 112 and sealing wall 68 being engaged, a seal can be formed between the insert portion 110 and the support portion 52, such that fluid flow is limited and/or reduced from flowing through the opening 50. With the insert portion 110 fully inserted into the stop opening 66, the insert opening 114 can substantially surround the adjustment legs 98 of the adjustment device 80.

Referring now to FIG. 8, once the insert portion 110 is inserted into the stop opening 66, the adjustment device 80 can be removed, with the adjustment ends 88 being removed from the adjustment groove 60. With the adjustment device 80 removed, the insert portion 110 can limit axial movement of the end cap plug 47 in a direction opposite from the first direction 39. The insert portion 110 can engage the end cap plug 47 on a first side and can engage the first groove end 61 and the first detent structure 58 on an opposing second side. Due to the central opening 112 having a smaller cross-sectional width than a cross-sectional width (diameter) of the first detent structure 58, the first detent structure 58 can function to limit the insert portion 110 from moving in the direction opposite from the first direction 39. Accordingly, the insert portion 110 can hold the cylindrically shaped section 34 in sealing contact against the conically shaped section 32 with the first attachment cap 37 forming a seal with the second attachment cap 38. Similarly, the conically shaped section 32 can be held in sealing contact with the partition 22. Accordingly, the filter assembly 20 can remain secured to the partition 22 as long as necessary.

To remove the filter assembly 20 from the partition 22, the aforementioned steps can be performed in a reverse order. Specifically, the adjustment device 80 can engage the support portion 52, with the adjustment ends 88 being inserted into the adjustment groove 60. The adjustment legs 98 can be positioned within the insert opening 114. The shaft portion 82 can initially be moved in the first direction 39, such that the end cap plug 47 moves axially in the first direction 39 and reduces pressure on the insert portion 110. The insert portion 110 can then be removed by moving the insert portion 110 in a direction that is opposite from the second direction 122. Once the insert portion 110 is removed, the adjustment device 80 can also be removed. As such, the end cap plug 47, conically shaped section 32 and cylindrically shaped section 34 can be moved axially in a direction opposite from the first direction 39 away from the partition 22. A user could then clean and/or replace the filter assembly 20 by repeating the attachment steps set forth above.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed:

1. A filter installation arrangement for a filter element extending along a longitudinal axis, the filter element including an end cap disposed at an end of the filter element, the arrangement including:
    a stop device extending through the end cap such that the end cap is axially movable with respect to the stop device;
    an adjustment device for axially displacing the end cap of the filter element in a first direction relative to the stop device; and
    an insert portion inserted to engage the stop device and located adjacent the end cap subsequent to the axial displacement of the end cap, wherein the insert portion is configured to limit axial displacement of the end cap in a second direction that is opposite the first direction.

2. The arrangement of claim 1, wherein the stop device is non-movably mounted with respect to a partition onto which the filter element is being attached.

3. The arrangement of claim 2, wherein the stop device includes a stop opening having stop rod extending therethrough, the stop opening being positioned between a first detent structure and a second detent structure supported by the stop rod.

4. The arrangement of claim 3, wherein the insert portion includes an insert opening, the insert portion being configured to be inserted into the stop opening such that the insert opening substantially surrounds the stop opening.

5. The arrangement of claim 4, wherein the adjustment device includes:
    two adjustment legs defining a gap therebetween;
    a pivot axle extending between the adjustment legs across the gap; and
    a shaft portion extending through the gap and attached to the pivot axle such that the shaft portion is configured to pivot with respect to the adjustment legs.

6. The arrangement of claim 5, wherein the shaft portion further includes at least one adjustment end disposed at an end of the shaft portion, the at least one adjustment end configured to be movable with respect to the pivot axle.

7. The arrangement of claim 6, wherein the at least one adjustment end engages the stop device such that movement of the at least one adjustment end is configured to move the at least one adjustment leg in a direction that is coaxial with the filter element.

8. The arrangement of claim 7, including an end cap plug engaged with the end cap, wherein the adjustment legs engage the end cap plug such that movement of the at least one adjustment end is configured to move the end cap plug and the end cap in the first direction, which the end cap plug and the end cap being movable from a first position in which the stop opening is blocked to a second position in which the stop opening is substantially open.

9. The arrangement of claim 8, wherein in the second position, the stop opening is configured to receive the insert portion.

10. A filter assembly including:
    a filter element extending along a longitudinal axis, the filter element including an end cap disposed at an end of the filter element;
    a stop device extending through the end cap such that the end cap is axially movable with respect to the stop device; and
    an insert portion inserted to engage the stop device and located adjacent the end cap subsequent to axial displacement of the end cap relative to the stop device, wherein the insert portion is configured to be supported by the stop device and limit axial movement of the end cap of the filter element relative to the stop device in a first direction.

11. The assembly of claim 10, wherein the stop device includes:
    a stop rod;
    first and second detent structures coaxially attached to the stop rod, the first and second detent structures being spaced apart along the stop rod to define a stop opening, the first and second detent structures having a diameter that is larger than a diameter of the stop rod; and
    a sealing wall extending across the stop opening between the first detent structure and the second detent structure, the sealing wall extending across the stop opening and cooperating with the insert portion.

12. The assembly of claim 11, wherein the insert portion includes an insert opening extending radially outward towards an outer edge of the insert portion.

13. The assembly of claim 12, wherein the insert opening includes a central opening disposed substantially at a center of the insert portion, wherein when the insert portion is inserted adjacent the end cap, the central opening is configured to substantially surround the stop rod in the stop opening.

14. The assembly of claim 13, wherein the central opening engages the first detent structure, second detent structure, and sealing wall, such that the insert portion is in sealing contact within the stop opening.

15. A method of installing a filter assembly to a partition, including:
   mounting a filter element on the partition, the filter element including an end cap disposed at an end of the filter element;
   displacing the end cap axially in a first direction towards the partition; and
   positioning an insert portion adjacent the end cap subsequent to axial displacement such that the insert portion prevents the end cap and filter element from moving axially in a second direction that is opposite the first direction.

16. The method of claim 15, further including the step of mounting the filter element onto a support structure that is attached to the partition such that the partition extends along an interior of the filter element.

17. The method of claim 16, wherein the support structure further includes a stop device extending from within the filter element at a first end and through an opening in the end cap at an opposing second end.

18. The method of claim 17, further including the step of attaching the insert portion to the stop device subsequent to axially displacing the end cap.

19. The method of claim 18, further including the step of forming a seal between the insert portion and the stop device such that the insert portion substantially covers the opening in the end cap.

20. The method of claim 18, further including the step of forming a seal between the insert portion and the end cap.

21. The arrangement of claim 3, wherein at least one of the detents is sized to pass through the end cap.

22. The arrangement of claim 1, wherein the stop device is axially slidable through the end cap and the adjustment device axially displaces the end cap relative to the stop device by axially sliding the stop device relative to the end cap in the first direction.

23. The arrangement of claim 22, wherein the insert portion is engageable with the stop device after the adjustment device displaces the end cap relative to the stop device.

* * * * *